United States Patent [19]

Jenkins

[11] Patent Number: 5,547,686
[45] Date of Patent: Aug. 20, 1996

[54] FEED SUPPLEMENTS FOR RUMINANTS AND METHOD FOR USING SAME

[75] Inventor: Thomas C. Jenkins, Central, S.C.

[73] Assignee: Clemson University, Clemson, S.C.

[21] Appl. No.: 290,461

[22] Filed: Aug. 15, 1994

[51] Int. Cl.$^6$ ............................. A23L 1/48; A61K 31/16
[52] U.S. Cl. ................... 426/2; 426/601; 514/627
[58] Field of Search ........................... 514/627; 426/2, 426/601

[56] References Cited

U.S. PATENT DOCUMENTS

| | | |
|---|---|---|
| 2,879,162 | 3/1959 | Baldini et al. . |
| 3,541,204 | 11/1970 | Sibbald et al. . |
| 3,624,114 | 11/1971 | Morelle . |
| 3,627,892 | 12/1971 | Moor . |
| 3,697,659 | 10/1972 | Marco .................................... 424/325 |
| 4,073,960 | 2/1978 | Scott et al. ............................. 426/580 |
| 4,093,740 | 6/1978 | Fahnenstich et al. . |
| 4,241,085 | 12/1980 | Fahnenstich et al. . |

OTHER PUBLICATIONS

Fotouhi et al., "Resistance of Fatty Acyl Amides to Degradation and Hydro by Ruminal Microorganisms", *J. Dairy Sci.*, Jun. 1992, pp. 1527–1532.

Fotouhi et al., "Ruminal Biohydrogenation of Linoleoyl Methionine and Calcium Linoleate in Sheep", *J. Anim. Sci,* 1992, pp. 3607–3614.

Langar, et al., N–Stearoyl–D,L–methionine, a Protected Methionine Source for Ruminants, pp. 808–814, 1978, Society of Chemical Industry.

Phillips, et al., Characteristics of Threonine, Valine and Methionine Absorption in the Jejunum and Ileum of Sheep, pp. 926–933, 1979, Journal of Animal Science, vol. 48, No. 4.

Wright, et al., Effects of Rumen–Protected Amino Acids on Ruminant Nitrogen Balance, Plasma Amino Acid Concentrations and Performance, pp. 2014–2027, 1988, Journal of Animal Science, vol. 66.

Preliminary Investigations on Some Potential Sources of Protected Methionine Derivatives for Ruminant Rations, J. Sci. Fd. Agric. 1977, 28, pp. 481–485.

Metabolism of Fatty Acyl Amides by Rumen Bacteria in Vitro, by N. Fotouhi, and T. C. Jenkins, Clemson University Animal Industries Research Conference, Clemson University, Jun. 14–15, 1990.

Fatty Acyl Amides Resist Biohydrogenation by Ruminal Microorganisms in Vitro, by N. Foutouhi and T. C. Jenkins, Abstracts American Society of Animal Science, Aug. 6–9, 1991, Laramie, Wyoming, p. 534.

Ruminal Biohydrogenation of Calcium Linoleate and Linoleoyl Methionine in Sheep, N. Fotouhi and T. C. Jenkins, ADSA Annual Meeting, Jun. 21–24, 1992, Columbus, Ohio, p. 170.

Resistance of Fatty Acyl Amides to Degradation and Hydrogenation by Ruminal Microorganisms, J. Dairy Sci., by N. Fotouhi and T. C. Jenkins, Jun. 1992, pp. 1527–1532.

Ruminal Biohydrogenation of Linoleoyl Methionine and Calcium Linoleate in Sheep, J. Anim. Sci. by N. Fotouchi and T. C. Jenkins, 1992, pp. 3607–3614.

N–steroyl–DL–methionine–A New Form of Protected Methionine for Ruminant Feeds Department of Applied Biochemistry and Nutrition, University of Nottingham, School of Agriculture, Abstracts of Communications, Mar. 30, 1973, vol. 32, pp. 86A–87A.

N–Stearoyl–D,L–methionine, A Protected Methionine Source for Ruminants, Department of Applied Biochemistry and Nutrition, University of Nottingham, School of Agriculture, J. Sci. Fd. Agric. pp. 808–814, 1978.

*Primary Examiner*—Paul J. Killos
*Assistant Examiner*—Rosalynd A. Williams
*Attorney, Agent, or Firm*—Dority & Manning, P.A.

[57] ABSTRACT

A fodder and a method are provided for increasing the amount of unsaturated fatty acids in the tissues and milk of ruminants. Specifically, the present invention includes feeding to a ruminant a composition containing the reaction product of an unsaturated fatty acid with a primary amine. The reaction product escapes hydrogenation in the stomachs of the ruminant allowing unsaturated fatty acids to be absorbed into the blood stream of the animal. In one embodiment, the unsaturated fatty acids used to react with the amine are derived from soybean oil. By increasing the amount of unsaturated fatty acids in the tissues and milk of ruminants, the food products obtained from those animals is healthier for human consumption.

24 Claims, No Drawings

5,547,686

1

FEED SUPPLEMENTS FOR RUMINANTS AND METHOD FOR USING SAME

BACKGROUND OF THE INVENTION

The present invention generally relates to a feed supplement for ruminants and, more particularly, to a feed supplement and method for increasing the amount of unsaturated fatty acids in the tissues and milk of ruminants.

Lipids are a class of compounds which contain long chains of aliphatic hydrocarbons and their derivatives. Generally, lipids are greasy to the touch and insoluble in water. One class of lipids, fats and oils, are substances that serve as nutrient reserves in animals and plants and are essential elements of the diet for most animals, including humans. Fats constitute one of the chief structural components of living cells.

Fats and oils are made up of two basic units: fatty acids and glycerol. Fatty acids are compounds containing a chain of carbon atoms attached to a carboxyl group. An important feature of fatty acids is the number of double bonds in their carbon chain. If their are no double bonds present, the fatty acid is considered saturated (with hydrogen atoms). If, on the other hand, a double bond is present in the carbon chain, the fatty acid is considered unsaturated. A polyunsaturated fatty acid is one in which there are two or more carbon double bonds.

When made a part of the diet, certain saturated fatty acids are known to cause adverse health effects, such as coronary heart disease and high blood pressure. Unsaturated fatty acids, on the other hand, have not been found to cause similar problems. Consequently, those skilled in the art have been attempting to find different ways, including modifying food products, for increasing the ratio of unsaturated to saturated fatty acids in an average person's diet.

One major source of saturated fatty acids in a normal diet comes from consuming red meat and milk. As such, the present invention is directed to a feed supplement for ruminants that increases the amount of unsaturated fatty acids absorbed by the animal for the construction of tissues and the production of milk. The meat and milk obtained from the animal results in a healthier food product for humans.

Although not directed to increasing the absorption of unsaturated fatty acids, other previous methods and feeds have been offered in the past for their effect on the animal. For instance, U.S. Pat. Nos. 4,093,740 and 4,241,085, both by Fahnenstich et al., are directed to a fodder for ruminants. Specifically, N-acyl-methionine is added to ruminant fodder in order to increase the intake of methionine, an amino acid, by ruminants. According to Fahnenstich et al., the additive results in an improvement, for example, in the growth of wool in sheep. The N-acyl-methionine is added in an amount to provide methionine in an amount from 0.01 to 5 percent based on the dry weight of the fodder.

U.S. Pat. No. 3,627,892 to Moor discloses a method of improving the growth rate of pigs, poultry, foul, and fur-bearing animals. The method includes administering a thiouracil-carboxylic acid to the animal. The method is for increasing growth rate, improving egg production in poultry, increasing fertility in fur-bearing animals, improving the skins of fur-bearing animals, and providing activity against certain diseases in pigs. Further, the thiouracil-carboxylic acid can be administered together with methionine or a biological equivalent thereof for further improving results.

2

An encapsulated biologically active material for feeding to ruminants is disclosed in U.S. Pat. No. 3,541,204 to Sibbald et al. The biologically active materials include amino acids, vitamins, and antibiotics, which are totally encased in a continuous film of protective material. The protective material is substantially immune to degradation in the rumen, which is the first stomach of the animal, but breaks down thereafter for releasing the biologically active materials. The protective material can be made from triglycerides such as hydrogenated vegetable and animals fats, waxes such as rice bran wax, resin wax blends, and formolized gelatin.

U.S. Pat. No. 2,879,162 to Baldini et al. relates to animal feeds containing added fat and free methionine. The basic feed containing methionine is modified by the addition of an edible fat. An edible fat refers to both fats and oils, as well as to the free fatty acids or derived lipids. The amount of added fat should be such that the total fat of the feed will amount to about 5 to 13 percent by weight of the total composition. Also, butyric acids can be used in place of the methionine. The resulting feed is primarily for increasing the growth of poultry but can also be directed to pigs, calves, lambs, and other domestic animals.

Further, U.S. Pat. No. 3,624,114 to Merelle discloses water insoluble, lipo-soluble compounds consisting of fatty acid amido-methionines for use in therapeutic and cosmetic preparations.

Thus, many different types of animal feeds and feed supplements have been offered in the past for producing desired effects in animals. However, a need exists for a method of increasing the amount of unsaturated fatty acids in the meat and milk of ruminants. The prior art is generally deficient in providing a method or a feed supplement that will accomplish this goal.

In the past, the present inventor attempted to determine whether the unsaturated fatty acids, linoleic acid or stearic acid, when reacted with the amino acid, methionine, are degraded by ruminal microbes and whether they inhibit fermentation in the stomachs of a ruminant. It was hypothesized that if the unsaturated fatty acids were not degraded, then the above-described reaction product may be used as a feed supplement to increase the intake of unsaturated fatty acids. The results of that study are disclosed in the article "Resistance of Fatty Acyl Amides to Degradation and Hydrogenation by Ruminal Microorganisms," published in the *Journal of Dairy Science*, Volume 75, pp. 1527–1532 (1992), which is incorporated herein by reference in its entirety.

Although some success was realized in the above study, the reactant products were found to be too expensive for commercial production. As such, an embodiment of the present invention is directed to using unsaturated fatty acids reacted with non-acidic primary amines to increase unsaturated fatty acid absorption by ruminants. As used herein, a non-acidic primary amine refers to a primary amine that is not an amino acid. Besides being more economical, other unexpected benefits are obtained from using non-acidic primary amines as will be apparent from the detailed description which follows.

SUMMARY OF THE INVENTION

The present invention recognizes and addresses the foregoing deficiencies, and others, of prior art constructions and methods. Accordingly, it is an object of the present invention to provide a method for increasing the amount of unsaturated fatty acids in the tissues and milk of ruminants.

It is another object of the present invention to provide a feed supplement for ruminants that will increase the amount of unsaturated fatty acids absorbed into the blood stream of the animal.

It is another object of the present invention to provide a feed supplement containing unsaturated fatty acids that are protected from biohydrogenation in the rumen of ruminants.

Still another object of the present invention is to provide a method for producing meat and milk products from ruminants that are healthier for human consumption.

These and other objects of the present invention are achieved by providing a method for increasing the amount of unsaturated fatty acids in the tissues and milks of ruminants. The method includes the step of feeding to a ruminant a composition containing a compound that is resistant to hydrogenation in the stomachs of the ruminant. In particular, the compound includes a reaction product of an unsaturated fatty acid and a non-acidic primary amine. The compound is present in the composition in an amount effective to increase absorption and deposition of unsaturated fatty acids in the tissues and milk of the ruminant.

In one embodiment, the ruminants can include cattle or sheep. The non-acidic primary amine selected for reaction with the unsaturated fatty acids can be an aliphatic amine or can be an amine containing from about 1 to about 30 carbon atoms. In a preferred embodiment, the unsaturated fatty acids for reaction with the amine are derived from soybean oil. When using soybean oil, the reaction product can include butylsoyamide or stearylsoyamide.

The compound containing the reaction product of the unsaturated fatty acid and the non-acidic primary amine can be mixed with conventional fodders for facilitating ingestion. In most formulations, the compound is present within the fodder in an amount from about 2 percent to about 20 percent by weight.

These and other objects are also accomplished by providing a fodder for ruminants for increasing the amount of unsaturated fatty acids in the tissues and milk of the ruminants. The fodder includes a base feed mixed with a composition. The composition is a product obtained from the reaction of a primary amine and unsaturated fatty acid. Preferably, the composition is present in the base feed in an amount effective to increase absorption and deposition of unsaturated fatty acids into the tissues and milk of the ruminants. The composition can be present within the fodder in an amount from about 2 percent to about 20 percent by weight and preferably from about 5 percent to about 10 percent by weight.

In one embodiment, the unsaturated fatty acids for reaction with the primary amine are derived from soybean oil. In particular, the reaction product can be butylsoyamide or stearylsoyamide.

The primary amine for reaction with the fatty acids can be an aliphatic amine and can contain from about 1 to about 30 carbon atoms. The base feed selected for mixing with the composition can include corn, hay, grass, grain, and mixtures thereof.

Other objects, features, and aspects of the present invention are discussed in greater detail below.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention is generally directed to a method for increasing the amount of unsaturated fatty acids in the tissues and milk of ruminants. More specifically, the method includes feeding ruminants a feed supplement containing the reaction product of a non-acidic primary amine and an unsaturated fatty acid. The feed supplement, which increases absorption and deposition of unsaturated fatty acids in the tissues and milk of ruminants, produces not only a healthier animal, but also provides food products obtained from the animal that are healthier for human consumption.

Ruminants generally refer to even-toed hoofed mammals that chew the cud and have a complex three or four chambered stomach. Animals that would be classified as ruminants include cattle, sheep, goats, deer, llamas, antelope, and others. Because of having multiple stomachs, the digestive system and process of ruminants differs substantially from that of monogastric animals.

The first and largest stomach located after the esophagus in ruminants is referred to as the rumen. Unique to ruminants, the rumen contains microorganisms, such as bacteria and protozoa, which break down complex compounds ingested by the animal by a process known as ruminal fermentation. Among the substances and compounds broken down by these microorganisms are unsaturated fatty acids. Specifically, unsaturated fatty acids typically undergo biohydrogenation by ruminal bacteria that results in the production of high levels of saturated free fatty acids. As used herein, biohydrogenation refers to the microbial process of saturating a compound with hydrogen, which would convert unsaturated fatty acids into saturated free fatty acids. As such, normally when ruminants ingest unsaturated fatty acids, they are converted to saturated fatty acids and absorbed into the tissues and milk of the animal.

As discussed above, fatty acids consist of a chain of carbon atoms attached to a carboxyl group. It is believed that ruminal bacteria require a free carboxyl group in order to biohydrogenate unsaturated fatty acids. As such, it has been discovered that by chemically reacting the carboxyl group of unsaturated fatty acids with a compound, the unsaturated fatty acid can escape or become resistant to biohydrogenation in the rumen. The unsaturated fatty acids can then proceed through the digestive system, being absorbed into the blood at the small intestines. From the blood, the unsaturated fatty acids ultimately become deposited into the tissues and milk of the animal.

Specifically, the method of the present invention includes feeding ruminants a feed supplement containing unsaturated fatty acids chemically reacted with a non-acidic primary amine, resulting in a compound classified as an unsaturated fatty acyl amide. The amide bond formed between the carboxyl group of an unsaturated fatty acid and a non-acidic primary amine is capable of resisting ruminal degradation. The resulting unsaturated fatty acid derivative is not biohydrogenated and is thereafter absorbed into the tissues and milk of the ruminant.

The reaction of an unsaturated fatty acid with a primary amine can be diagramed as follows:

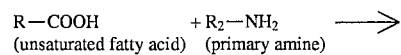
R—COOH  + R$_2$—NH$_2$  ⟶
(unsaturated fatty acid) (primary amine)

-continued

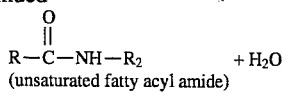
(unsaturated fatty acyl amide)

The method of the present invention has also been found not to cause harmful side effects in the animal. For instance, when free fatty acids are increased in the diet of a ruminant, the fatty acids have an inhibitory effect on bacterial fermentation within the rumen. However, the chemically reacted unsaturated fatty acids in the present invention have not demonstrated a similar effect.

Generally, any primary amine can be used in the present invention as long as it will react with an unsaturated fatty acid. Preferably, a primary amine will be chosen that will not interfere with the normal digestive processes of a ruminant but will provide some nutritional value to the animal. Examples of preferred amines include non-acidic primary amines, aliphatic amines and generally primary amines having carbon chains containing up to about 30 carbon atoms. Representative amines for use in the present invention would include butyl amine and octadecyl amine.

Similar to the selection of a primary amine, any unsaturated fatty acid can be incorporated into the present invention, whether the fatty acid is unsaturated or polyunsaturated. Selection of unsaturated fatty acids for use in the present invention can depend upon a number of factors. For instance, selection can depend upon the particular application, the particular animal, the effect of the unsaturated fatty acid on the digestive system of the animal, the economics of using a particular unsaturated fatty acid, or the ability of the unsaturated fatty acid to react with a primary amine.

In one particular embodiment, the unsaturated fatty acids used in the present invention can be derived from soybean oil. Soybean oil is particularly useful in the present invention since it contains high amounts of unsaturated fatty acids. In particular, about 85 percent of some soybean oils are comprised of unsaturated fatty acids.

The primary unsaturated fatty acid contained in soybean oil is linoleic acid. Other unsaturated fatty acids in soybean oil include oleic acid and linolenic acid. These fatty acids mostly appear in the form of triglycerides. Triglycerides are esters of fatty acids and glycerol.

In reacting soybean oil with a primary amine, the soybean oil and amine are first mixed so that the molar ratio between soybean oil and the amine is about one to four. When using butyl amine, the weight ratio between soybean oil and the amine is conveniently about one to one. In one embodiment, the mixture is heated in a closed container at about 70° C. for about 10 hours. After being heated, the resulting mixture is in the form of a semi-solid, viscous liquid. Although optional, the product can then be washed if desired. Washing with water removes any unreacted amines and glycerol. However, the byproducts can be ingested by ruminants without any adverse consequences. In fact, glycerol can serve as a source of carbohydrates.

The reaction product of unsaturated fatty acids contained in soybean oil with a primary amine is referred to herein as a soyamide. Examples of soyamides would include butylsoyamide or stearylsoyamide. Butylsoyamide is particularly useful in the present invention because it is relatively inexpensive to produce and is readily ingested by ruminants.

Of course, soyamides are just one particular class of compounds that can be used in the present invention in order to increase absorption of unsaturated fatty acids in ruminants. Generally speaking, any reaction product of an unsaturated fatty acid with a non-acidic primary amine may be equally applicable. As should be appreciated by those skilled in the art, methods of preparation of such other unsaturated fatty acyl amides are well known and detailed description of such preparation routes is not necessary for proper understanding of the present invention.

Once an unsaturated fatty acyl amide such as a soyamide is produced, the reaction product is preferably mixed with a substrate for facilitating ingestion by a ruminant. For instance, suitable substrates include conventional animal fodders or base feeds. Depending upon the ruminant, the unsaturated fatty acyl amide can be added to corn, hay, grass, grain, or mixtures thereof for producing a feed that will be readily eaten by a particular ruminant. The unsaturated fatty acyl amide can be added to the base feed or fodder in an amount effective to increase absorption and deposition of unsaturated fatty acids in the tissues and milk of the ingesting ruminant. Preferably, the unsaturated fatty acyl amide is added to fodder or a base feed in amount from about 2 percent to about 20 percent by weight. However, proportionate amounts may increase or decrease depending upon the ruminant, the desired results, and the particular substrate used.

Once mixed with a substrate, such as a fodder or base feed, the unsaturated fatty acyl amides can be fed to ruminants as part of their normal diet. The unsaturated fatty acyl amides resist biohydrogenation in the rumen, thus increasing the amount of unsaturated fatty acids absorbed and deposited in the tissues and milk of the animal. The feed supplement not only produces healthier food products for human consumption, but also provides needed fatty acids to the ruminant without interfering with digestion or feed intake.

The present invention may be better understood by reference to the following example:

EXAMPLE 1

Butylsoyamide, made by reacting butyl amine with soybean oil, was fed to sheep to determine if it resisted biohydrogenation in the rumen and increased blood unsaturated fatty acids in the bloodstream. The soybean oil chosen contained 84.5 percent unsaturated fatty acids with the primary fatty acid being linoleic acid, comprising approximately 50 to 60 percent of the fatty acids. Normally, feeding soybean oil to sheep results in little change in the amount of unsaturated fatty acids found in the blood since bacteria in the rumen hydrogenate the unsaturated fatty acids and convert them to more saturated end products.

Twelve sheep were divided into three groups of four and fed a different but nutritionally balanced diet. The first group of sheep, designated as a control, were fed a conventional sheep feed composition consisting of a 50:50 mixture of corn silage and grain mix on a dry matter basis. The second group of sheep were fed a similar feed composition containing 5 percent by weight soybean oil, while the third group of sheep were fed a feed composition containing 5 percent by weight butylsoyamide. Specifically, the following feed formulations of corn silage were mixed. These formulations were then combined with an equal weight amount of grain mix before being fed to the sheep.

TABLE 1

| Component (wt %) | Control | Group II Soybean Oil | Group III Butylsoyamide |
|---|---|---|---|
| corn | 84.7 | 72.0 | 72.0 |
| soybean meal | 11.4 | 14.1 | 14.1 |
| limestone | 1.9 | 1.9 | 1.9 |
| salt | 1.0 | 1.0 | 1.0 |

TABLE 1-continued

| Component (wt %) | Control | Group II Soybean Oil | Group III Butylsoyamide |
|---|---|---|---|
| ammonium chloride | 1.0 | 1.0 | 1.0 |
| soybean oil | — | 10.0 | — |
| butylsoyamide | — | — | 10.0 |

Blood and rumen samples were taken from the sheep after 17 days and after 31 days. Plasma was isolated from the blood samples by centrifugation and analyzed for fatty acid composition. Neutral lipids were then extracted from the plasma samples and, again, analyzed for fatty acid composition. The neutral lipids were separated in order to examine more closely how fatty acids changed in blood triglycerides following consumption of the respective feed compositions.

As used herein the following abbreviation system will be used to identify particular fatty acids that were found during testing:

C#:# wherein the first # represents the number of carbon atoms in the carbon chain, and the second # represents the number of carbon/carbon double bonds contained within the particular fatty acid. Consequently, linoleic acid would be abbreviated C18:2 which has a carbon chain 18 carbon atoms long containing two double bonds. This designation aids in identifying and distinguishing between unsaturated fatty acids and saturated fatty acids.

The following table contains the results of blood plasma samples taken after 17 days and after 31 days. Specifically, blood samples were withdrawn by jugular venipuncture into tubes containing sodium oxalate as an anticoagulant. The tubes were centrifuged at 1,500×g in order to separate out the plasma. One milliliter of plasma was then mixed with 10 ml chloroform/methanol (1:1) and shaken for one hour. The mixture was centrifuged and the pellet re-extracted with 5 ml chloroform. Water (3 ml) was added to the extracts, and the chloroform was analyzed for fatty acids. The results were then averaged.

TABLE 2

| Fatty Acid (g/100 g) | Control | Group II Soybean Oil | Group III Butylsoyamide |
|---|---|---|---|
| C14:0 | .49 | .42 | .41 |
| C15:0 | .48 | .31 | .39 |
| C16:0 | 17.09 | 17.38 | 16.01 |
| C18:0 | 26.67 | 19.85 | 22.93 |
| C18:1 | 17.48 | 13.93 | 9.02 |
| C18:2 | 26.66 | 32.62 | 42.11 |
| C20:4 | 6.11 | 4.34 | 4.43 |

As discussed above, linoleic acid (C18:2) is the most prevalent fatty acid in soybean oil. As shown in Table 2, the amount of linoleic acid in plasma increased about 22 percent in the Group II sheep fed soybean oil when compared to the control indicating that some of the linoleic acid contained in the soybean oil escaped ruminal biohydrogenation. However, the sheep of Group III fed the butylsoyamide supplement showed nearly a 60 percent increase in the amount of linoleic acid in plasma over the control.

Table 3 contains the results of analyzing plasma neutral lipids extracted from the blood samples collected above. Specifically, the blood plasma was first separated by centrifugation. The plasma lipids were extracted into chloroform and then subjected to column chromatography in order to isolate the neutral lipids. Gas chromatography was then performed on the samples producing the following results.

TABLE 3

| Fatty Acid (g/100 g) | Control | Group II 5% Soybean Oil | Group III 5% Butylsoyamide |
|---|---|---|---|
| C14:0 | .69 | .60 | .43 |
| C16:0 | 16.00 | 16.66 | 14.17 |
| C18:0 | 22.88 | 15.03 | 16.10 |
| Ccis18:1 | 21.51 | 17.60 | 11.95 |
| Ctrans18:1 | .37 | 9.00 | 1.41 |
| C18:2 | 31.61 | 36.61 | 52.07 |
| C20:4 | 3.24 | 2.58 | 2.17 |

As shown above, in plasma neutral lipids, the amount of linoleic acid increased more than 65 percent in the sheep of Group III fed the 5 percent butylsoyamide when compared to the control.

Rumen samples were also taken after 17 days and after 31 days in order to determine whether the particular diets affected ruminal fermentation. Specifically, the ruminal samples were tested for pH and for volatile fatty acids. In order to test for volatile fatty acids, a 4 milliliter aliquot of each sample was mixed with 1 milliliter of 25 percent metaphosphoric acid (weight/weight) and centrifuged at 35,000×g for 20 minutes at 4° C. One milliliter of supernate from each collection time was mixed with 10 umol of 2-ethyl butyrate as an internal standard and analyzed for volatile fatty acids by gas chromatography. The following results were obtained.

TABLE 4

|  | Control | Group II 5% Soybean Oil | Group III 5% Butylsoyamide |
|---|---|---|---|
| Rumen pH | 6.53 | 6.91 | 6.64 |
| Volitile Fatty Acids |  |  |  |
| Total (mM) | 59.0 | 38.7 | 54.4 |
| Acetate (%) | 70.5 | 62.4 | 65.8 |
| Propionate (%) | 17.8 | 29.6 | 23.5 |
| Butyrate (%) | 9.5 | 7.0 | 9.5 |
| Ac/Pr | 4.1 | 2.6 | 3.0 |

As shown above, when compared to the control, the sheep of Group II fed 5 percent soybean oil showed a decrease in the total volatile fatty acids and an increase in pH. These results reflect a negative effect on ruminal fermentation, which is a typical reaction in ruminants fed unsaturated fats at this level. However, the sheep fed butylsoyamide showed no similar effect.

Besides increasing the amount of unsaturated fatty acids in the blood without a negative effect on ruminal fermentation, the feed containing the butylsoyamide supplement was preferred by sheep. The following table shows that the sheep of Group III on the butylsoyamide diet ate more in comparison to the sheep of Group II and to the Control.

TABLE 5

|  | Control | Group II 5% Soybean Oil | Group III 5% Butylsoyamide |
|---|---|---|---|
| Average Feed Intake Over 31 days (g/d) | 680 | 581 | 740 |

It should be understood that the present invention is not limited to the specific compositions or methods described herein and that any composition having a formula or method steps equivalent to those described falls within the scope of the present invention. Preparation routes of the composition of the composition and method steps are merely exemplary so as to enable one of ordinary skill in the art to make the composition and use it according to the described process and its equivalents. It will also be understood that, although the form of the invention shown and described herein constitutes preferred embodiments of the invention, it is not intended to illustrate all possible forms of the invention. In addition, it should be understood that aspects of the various embodiments disclosed herein may be interchanged both in whole or in part. The words used are words of description rather than of limitation. Various changes and variations may be made to the present invention without departing from the spirit and scope of the following claims.

What is claimed is:

1. A method for increasing the amount of unsaturated fatty acids in the tissues and milk of ruminants, said method comprising the step of:

feeding to a ruminant a composition containing a compound that is resistant to hydrogenation in the stomachs of said ruminant, wherein said compound is present in said composition in an amount effective to increase absorption and deposition of unsaturated fatty acids in the tissues and milk of said ruminant; and wherein said compound comprises a reaction product of an unsaturated fatty acid and a non-acidic amine.

2. The method as defined in claim 1, wherein said ruminants are cattle.

3. The method as defined in claim 1, wherein said ruminants are sheep.

4. The method as defined in claim 1, wherein said reaction product is an unsaturated fatty acyl amide.

5. The method as defined in claim 1, wherein said non-acidic amine is an aliphatic amine.

6. The method as defined in claim 1, wherein said non-acidic amine contains from 1 to 30 carbon atoms.

7. The method as defined in claim 1, wherein said compound comprises a reaction product of unsaturated fatty acids contained in a soybean oil and a non-acidic amine.

8. The method as defined in claim 7, wherein said reaction product is butylsoyamide.

9. The method as defined in claim 7, wherein said reaction product is stearylsoyamide.

10. The method as defined in claim 1, wherein said composition is a fodder.

11. The method as defined in claim 1, wherein said compound is present in said composition in an amount from about 2 percent to about 20 percent by weight of the composition.

12. A method for increasing the amount of unsaturated fatty acids in the tissues and milk of ruminants for making the food products obtained from ruminants healthier for human consumption, said method comprising the step of:

feeding to a ruminant a fodder containing a compound, said compound being resistant to hydrogenation in the stomachs of said ruminant;

said compound comprising a product obtained from the reaction of a primary amine with unsaturated fatty acids, wherein said unsaturated fatty acids are derived from soybean oil; and wherein said compound is present in said fodder in an amount effective to increase absorption and deposition of unsaturated fatty acids in the tissues and milk of said ruminant.

13. The method as defined in claim 12, wherein said primary amine is also an aliphatic amine.

14. The method as defined in claim 12, wherein said primary amine contains from 1 to 30 carbon atoms.

15. The method as defined in claim 12, wherein said product is butylsoyamide.

16. The method as defined in claim 12, wherein said product is stearylsoyamide.

17. The method as defined in claim 12, wherein said compound is present in said fodder in an amount from about 2 percent to about 20 percent by weight.

18. A fodder for ruminants for increasing the amount of unsaturated fatty acids in the tissues and milk of said ruminants, said fodder comprising:

a) a base feed; and b) a composition mixed with said base feed, said composition comprising a product obtained from the reaction of a non-acidic amine and an unsaturated fatty acid, wherein said composition is present in an amount effective to increase absorption and deposition of unsaturated fatty acids in the tissues and milk of said ruminants.

19. The fodder as defined in claim 18, wherein said unsaturated fatty acid is derived from soybean oil.

20. The fodder as defined in claim 19, wherein said product is butylsoyamide.

21. The fodder as defined in claim 18, wherein said non-acidic amine is an aliphatic amine containing from 1 to 30 carbon atoms.

22. The fodder as defined in claim 18, wherein said composition is present in said fodder in an amount from about 2 percent to about 20 percent by weight.

23. The fodder as defined in claim 18, wherein said composition is present in said fodder in an amount from about 5 percent to about 10 percent by weight.

24. The fodder as defined in claim 18, wherein said base feed is a material selected from the group consisting of corn, hay, grass, grain, and mixtures thereof.

* * * * *